Aug. 29, 1933.    J. PROUTY    1,924,960
NONCLOGGING HARROW
Filed April 27, 1932    2 Sheets-Sheet 1

Aug. 29, 1933. J. PROUTY 1,924,960
NONCLOGGING HARROW
Filed April 27, 1932 2 Sheets-Sheet 2

Inventor
J. Prouty
By
Attorney

Patented Aug. 29, 1933

1,924,960

UNITED STATES PATENT OFFICE 1,924,960

NONCLOGGING HARROW

Jason Prouty, Hillpoint, Wis.

Application April 27, 1932. Serial No. 607,821

3 Claims. (Cl. 55—11)

This invention relates to a harrow and aims to provide a novel construction which avoids clogging during operation thereof.

It is particularly aimed to provide a harrow having a roller with which a plurality of spring tines coact with the teeth of the roller, so that the latter will remove any trash or material adhering to the tines.

In addition, it is aimed to provide a construction wherein teeth coact with the teeth of the roller in order to break the sod or lumps of earth, before returning to the ground.

A further object is to provide an improved construction having means which operate behind the roller, for engagement with the ground to aid in breaking the same and reducing the size of lumps of earth.

The more specific objects and advantages will become apparent from a consideration of the description following taken in connection with accompanying drawings illustrating an operative embodiment.

In said drawings:—

Figure 1:
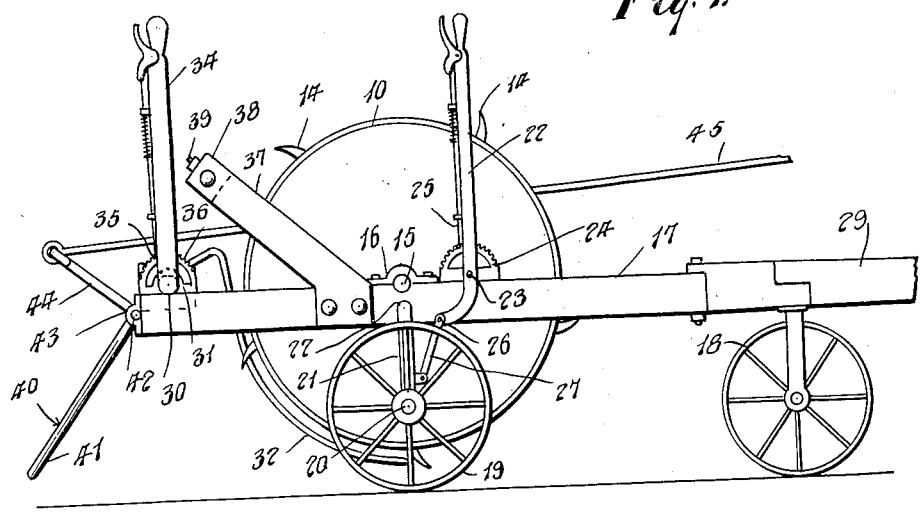
Figure 1 is a view of the device in side elevation.
Figure 2:
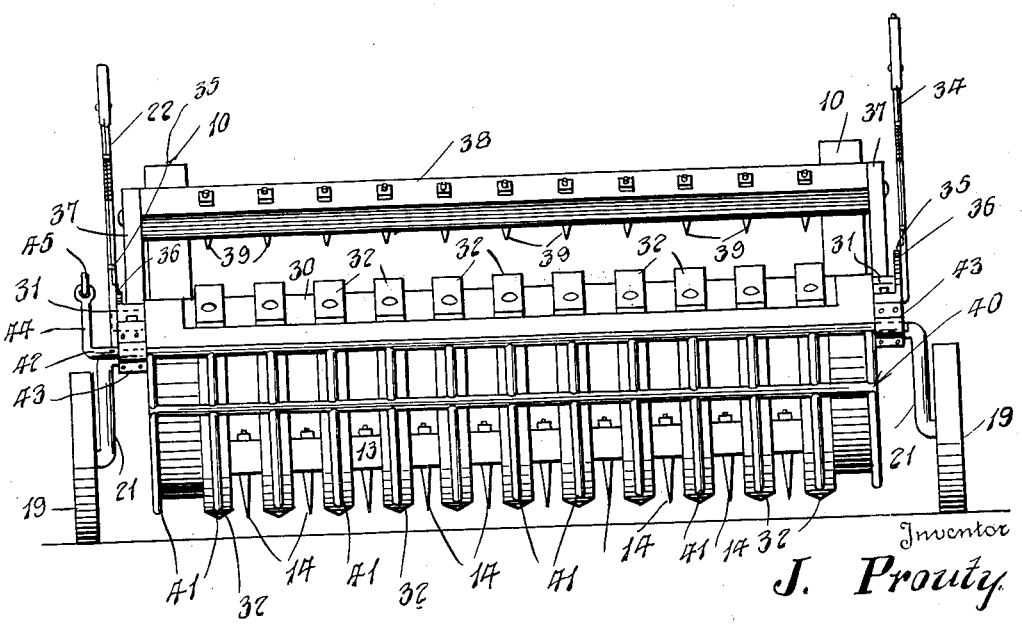
Figure 2 is a rear elevation.
Figure 3:
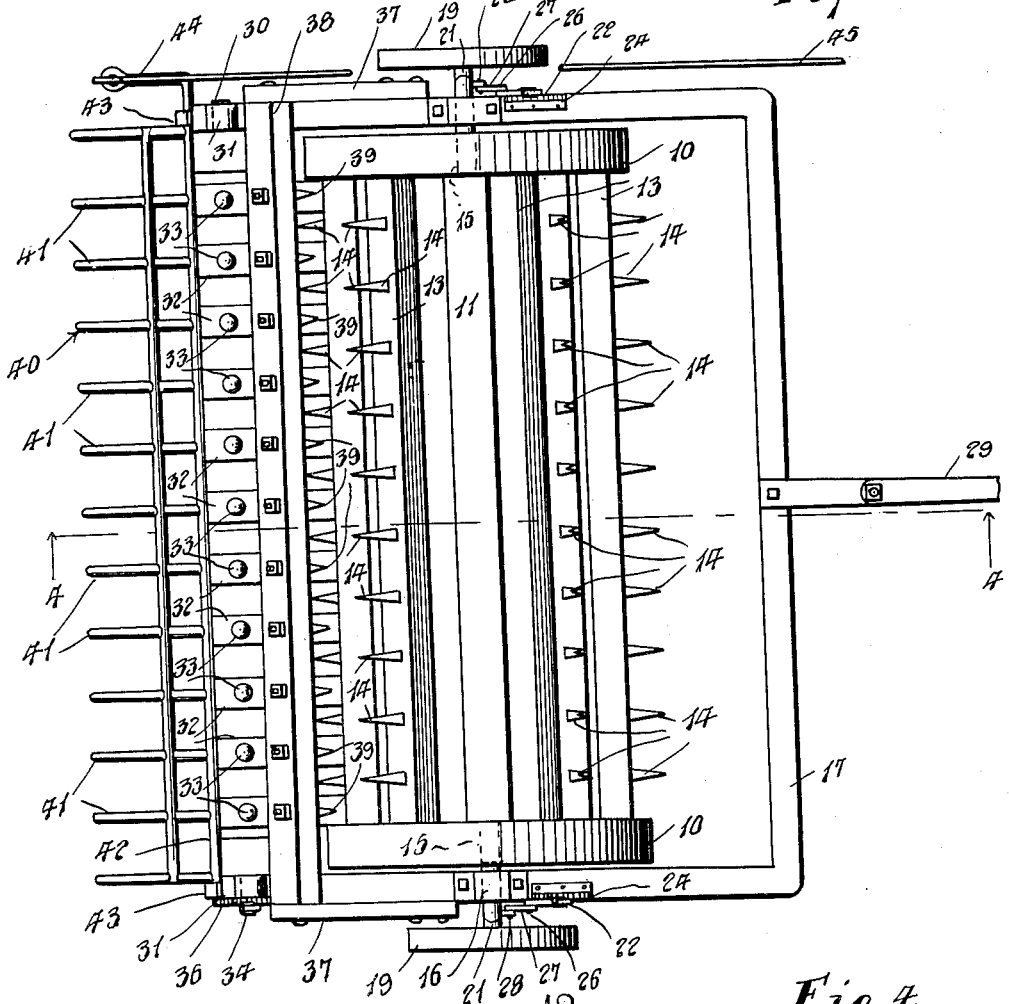
Figure 3 is a plan view.
Figure 4:
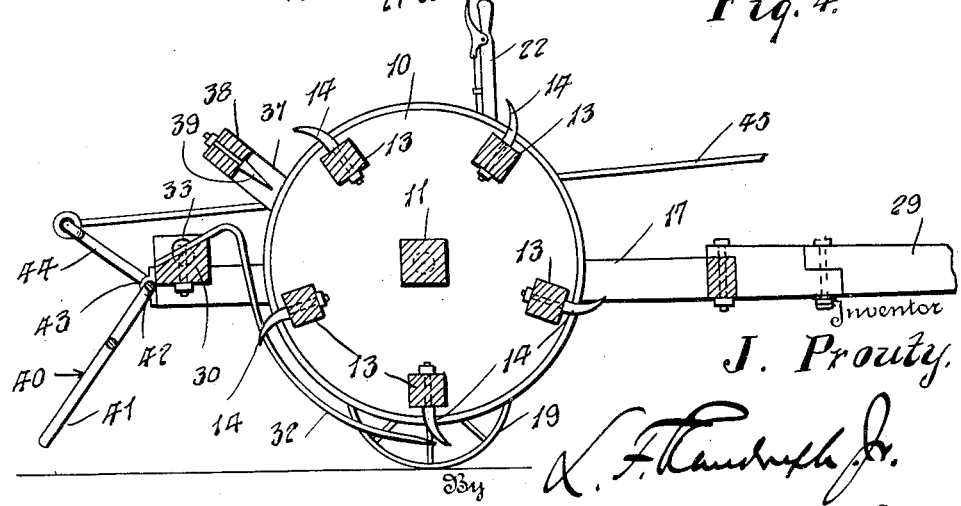
Figure 4 is a longitudinal sectional view taken on the line 4—4 of Figure 3.

Referring specifically to the drawings, the harrow utilizes a suitable roller generally designated 10 which comprises an axle 11 having longitudinally spaced disks thereon mounting the cross bars 13, which carry series of harrow teeth 14. Axle 11 at its terminals 15 is rounded and journaled in bearings 16 carried by a suitable open frame 17.

The frame 17 is supported from the ground as by means of a wheel 18 adjacent the front thereof and wheels 19 adjacent the roller. Wheels 19 are journaled on axle portions 20 of cranks 21 journaled at 22 on the frame. The cranks 21 may be swung to different portions or angles in order to vary the height of the frame 17 and accordingly of the roller 10. To this end, levers, one for each wheel 19, are provided as at 22, being pivoted at 23 to toothed segments 24 to which the levers may be locked in adjusted position by latch mechanism 25. Such levers at 26 are pivoted to links 27, in turn pivoted at 28 to the cranks. The device may be drawn by any suitable power, that is by animals or by a tractor, connected to a draft tongue 29 or otherwise.

A rock shaft 30 is journaled in bearings 31 arranged transversely of frame 17 and the same carries a plurality of spring tines 32, the latter being secured to the shaft as by means of bolts 33. The tines 32 are arcuate and terminate at their forward ends substantially directly under the axle 11. Shaft 30 is adapted to be rocked and secured in adjusted positions so as to vary the position of the tines 32 with respect to the roller, through the medium of a lever 34 rigid with the shaft and a locking or latching device 35 coacting with a toothed segment 36 secured on the frame.

Particular attention is called to the fact that the tines 32 are so arranged that the teeth 14 extend between each pair of tines 32 to break the ground between said teeth, providing a substantially spring tooth harrow in combination with the toothed roller, and also serve to dislodge any trash or matter which would tend to clog the device.

Extending upwardly and rearwardly from the frame 17, are brackets 37 mounting a cross bar 38, carrying spikes 39 adapted to coact with the teeth 14 in order to break up clods, sod, or the like.

A raking, clod-breaking and ground leveling device is provided at 40, which may comprise a single metallic element of skeleton form having teeth or projections 41, adapted at lower or free ends for engagement with the ground. The devices 40 includes a shaft 42 whereby it is journaled in bearings 43 and further includes a crank 44 extending therefrom and operatively connected with a link 45 or suitable means adapted to be manually pushed or pulled in order to vary the elevation of the lower end of the teeth 41. Obviously, an adjusting lever and rack may be provided for the rod 45 like the levers 22 and 34 and their coacting lock and segments.

Various changes may be resorted to provided they fall within the spirit and scope of the invention.

What is claimed is:—

1. A machine of the class described comprising a frame, a harrow roller journaled thereon having teeth, spring tines on the frame between which said teeth are adapted to operate, said tines being positioned to engage the ground between the teeth on the roller to agitate the soil between the teeth, a shaft carrying said spring tines, and means for adjusting said shaft, said spring tines having elongated arcuate portions relatively close and conforming to the periphery of the roller.

2. A machine of the class described comprising a frame, a harrow roller journaled thereon having teeth, spring tines on the frame having elongated arcuate portions relatively close and conforming to the periphery of the cylinder between which said teeth are adapted to operate, said tines being positioned to engage the ground between the teeth on the roller to agitate the soil between the teeth, means adjacent the tines coacting with the teeth to break clods and the like comprising a bar, angularly disposed brackets mounting said bar, and teeth carried by the bar, a device at the rear of the machine having a rod journaled thereon, and teeth extending downwardly having free ends for engagement with the ground.

3. A machine of the class described comprising a frame, a harrow roller journaled thereon having teeth, a cross member on the frame, spring tines on the cross-member between which said teeth are adapted to operate, means to rotatably adjust the cross member and tines, said tines being positioned to engage the ground between the teeth on the roller to agitate the soil between the teeth, means adjacent the tines coacting with teeth to break clods and the like comprising a bar, angularly disposed brackets mounting said bar, and teeth carried by the bar, cranks journaled on the frame wheels journaled on the cranks, levers pivoted to the frame, links connecting the levers to said cranks, and an open work device having a rod journaled on the rear of the machine, teeth on said rod extending to the ground, a crank extending from the rod, and means to actuate said crank.

JASON PROUTY.